(12) United States Patent
He et al.

(10) Patent No.: US 11,636,582 B1
(45) Date of Patent: Apr. 25, 2023

(54) STITCHING QUALITY EVALUATION METHOD AND SYSTEM AND REDUNDANCY REDUCTION METHOD AND SYSTEM FOR LOW-ALTITUDE UNMANNED AERIAL VEHICLE REMOTE SENSING IMAGES

(71) Applicant: Zhejiang University, Zhejiang (CN)

(72) Inventors: Yong He, Hangzhou (CN); Xiaoyue Du, Hangzhou (CN)

(73) Assignee: Zhejiang University, Zhejiang (CN)

( * ) Notice: Subject to any disclaimer, the term of this patent is extended or adjusted under 35 U.S.C. 154(b) by 0 days.

(21) Appl. No.: 17/880,964

(22) Filed: Aug. 4, 2022

(30) Foreign Application Priority Data

Apr. 19, 2022 (CN) .......................... 202210407706.4

(51) Int. Cl.
  *G06T 7/00* (2017.01)
  *G06T 3/40* (2006.01)
(52) U.S. Cl.
  CPC .......... *G06T 7/0002* (2013.01); *G06T 3/4038* (2013.01); *G06T 2207/10032* (2013.01); *G06T 2207/30168* (2013.01)
(58) Field of Classification Search
  CPC ................ G06T 7/0002; G06T 3/4038; G06T 2207/10032; G06T 2207/30168
  See application file for complete search history.

(56) References Cited

U.S. PATENT DOCUMENTS

| 6,771,396 | B1* | 8/2004 | Cheatle | H04N 1/04 |
|---|---|---|---|---|
| | | | | 358/488 |
| 10,358,235 | B2* | 7/2019 | Nixon | H04N 25/41 |
| 2008/0093551 | A1* | 4/2008 | Tsuneta | H01J 37/153 |
| | | | | 382/255 |
| 2014/0168475 | A1* | 6/2014 | Corkery | G02B 13/06 |
| | | | | 396/529 |
| 2016/0328827 | A1* | 11/2016 | Ilic | G06T 11/60 |
| 2018/0157899 | A1* | 6/2018 | Xu | G06N 3/0454 |
| 2019/0043184 | A1* | 2/2019 | Bovik | G06T 7/0002 |
| 2019/0108627 | A1* | 4/2019 | Medasani | G06F 16/58 |

(Continued)

OTHER PUBLICATIONS

Chow, L.S., et al., "Modified-BRISQUE as no reference image quality assessment for structural MR images", Magnetic Resonance Imaging, 43 (2017), 74-87.*

*Primary Examiner* — Xuemei G Chen
(74) *Attorney, Agent, or Firm* — Reising Ethington P.C.

(57) ABSTRACT

The present disclosure provides a stitching quality evaluation method and system, and a redundancy reduction method and system for low-altitude UAV remote sensing images, and belongs to the technical field of image processing. The method comprises: firstly acquiring ground images using a UAV under a preset overlap degree to obtain a low-altitude UAV remote sensing image set, then stitching the low-altitude UAV remote sensing image set to obtain a stitched image, and finally performing a quality evaluation on the stitched image using an improved BRISQUE algorithm to obtain an image quality score, which is applicable to quality evaluation of visible images and multispectral images at the same time through the improved BRISQUE algorithm. In addition, the present disclosure further provides an image redundancy reduction method based on the improved BRISQUE algorithm, thereby improving the image stitching efficiency and stitching quality.

8 Claims, 6 Drawing Sheets

Acquiring ground images by utilizing a UAV under a preset overlap degree to obtain a low-altitude UAV remote sensing image set under the preset overlap degree;

— S1

Stitching the low-altitude UAV remote sensing image set to obtain a stitched image;

— S2

Performing a quality evaluation on the stitched image by utilizing an improved BRISQUE algorithm to obtain an image quality score.

— S3

(56) References Cited

U.S. PATENT DOCUMENTS

| | | | | |
|---|---|---|---|---|
| 2020/0366840 | A1* | 11/2020 | Zhang | H04N 7/188 |
| 2021/0004600 | A1* | 1/2021 | Newman | G06N 3/08 |
| 2021/0097260 | A1* | 4/2021 | Verma | G06V 10/54 |
| 2021/0195103 | A1* | 6/2021 | Mehta | G01C 21/025 |
| 2021/0223040 | A1* | 7/2021 | Liu | H04N 5/23216 |
| 2021/0248379 | A1* | 8/2021 | Choi | G06V 20/41 |
| 2021/0358106 | A1* | 11/2021 | Liu | G06Q 10/06315 |
| 2021/0383557 | A1* | 12/2021 | Brauer | G06T 7/344 |
| 2022/0222834 | A1* | 7/2022 | Miyakawa | H04N 5/232 |
| 2022/0234753 | A1* | 7/2022 | Byrne | G03B 15/006 |
| 2022/0262094 | A1* | 8/2022 | Miyakawa | G06V 10/44 |
| 2022/0329730 | A1* | 10/2022 | Miyakawa | G06T 5/50 |
| 2022/0345641 | A1* | 10/2022 | Li | G06T 7/80 |

\* cited by examiner

STITCHING QUALITY EVALUATION METHOD AND SYSTEM AND REDUNDANCY REDUCTION METHOD AND SYSTEM FOR LOW-ALTITUDE UNMANNED AERIAL VEHICLE REMOTE SENSING IMAGES

TECHNICAL FIELD

The present disclosure relates to the technical field of image processing, in particular to a stitching quality evaluation method and system, and a redundancy reduction method and system applicable to low-altitude unmanned aerial vehicle (UAV) remote sensing images.

BACKGROUND ART

Low-altitude UAV remote sensing is important means for monitoring the growth vigor and physiological condition of farmland crops. An overlap degree setting is one of indispensable parameters in the flight process of a UAV. In order to explore the influence of the overlap degree on the quality of stitched images of the UAV and obtain high-quality low-altitude UAV remote sensing image data, it is necessary, by means of an eight-rotor UAV flight platform carrying a multispectral camera and an RGB camera, to acquire crop images by adopting different overlap degree settings under the condition that the flight speeds, the flight heights and the flight paths are the same. However, most of existing image quality evaluation methods are merely applicable to visible images, rather than multispectral images.

SUMMARY

The present disclosure provides a stitching quality evaluation method and system, and a redundancy reduction method and system for low-altitude UAV remote sensing images using an improved BRISQUE algorithm to perform quality evaluation on the low-altitude UAV remote sensing images, which are applicable to both visible images and multispectral images. Meanwhile, an image redundancy reduction method is proposed based on the improved BRISQUE algorithm, so that the image stitching efficiency and stitching quality can be improved.

The present disclosure provides the following scheme.

In the first aspect, the present disclosure provides a stitching quality evaluation method for low-altitude UAV remote sensing images. The evaluation method comprises:

acquiring ground images by utilizing a UAV under a preset overlap degree to obtain a low-altitude UAV remote sensing image set under the preset overlap degree, where the low-altitude UAV remote sensing image set comprises a plurality of remote sensing images, and the remote sensing images are visible images or multispectral images;

stitching the low-altitude UAV remote sensing image set to obtain a stitched image; and performing a quality evaluation on the stitched image by utilizing an improved BRISQUE algorithm to obtain an image quality score.

The present disclosure further provides a stitching quality evaluation system for low-altitude UAV remote sensing images. The evaluation system comprises:

an image acquisition module, configured to acquire ground images by utilizing a UAV under a preset overlap degree to obtain a low-altitude UAV remote sensing image set under the preset overlap degree, where the low-altitude UAV remote sensing image set comprises a plurality of remote sensing images, and the remote sensing images are visible images or multispectral images;

an image stitching module, configured to stitch the low-altitude UAV remote sensing image set to obtain a stitched image; and a quality evaluation module, configured to perform a quality evaluation on the stitched image by utilizing an improved BRISQUE algorithm to obtain an image quality score.

In the second aspect, the present disclosure provides a redundancy reduction method for low-altitude UAV remote sensing images. The redundancy reduction method comprises:

acquiring ground images by utilizing a UAV under a preset overlap degree to obtain a low-altitude UAV remote sensing image set under the preset overlap degree, where the low-altitude UAV remote sensing image set comprises a plurality of remote sensing images, and the remote sensing images are visible images or multispectral images;

performing a quality evaluation on each remote sensing image by utilizing an improved BRISQUE algorithm to obtain an image quality score;

taking a lower limit of the preset overlap degree as a fixed redundancy interval;

performing a redundancy reduction on the low-altitude UAV remote sensing image set according to the fixed redundancy interval and the image quality score of each remote sensing image to obtain a redundancy-reduced image set;

determining whether the redundancy-reduced image set is able to be stitched or not;

if yes, increasing the fixed redundancy interval by 1 to obtain a new redundancy interval, taking the new redundancy interval as a fixed redundancy interval of a next cycle, and returning to the step of performing the redundancy reduction on the low-altitude UAV remote sensing image set according to the fixed redundancy interval and the image quality score of each remote sensing image; and if no, stitching a redundancy-reduced image set obtained in a previous cycle to obtain a stitched image.

The present disclosure further provides a redundancy reduction system for low-altitude UAV remote sensing images. The redundancy reduction system comprises:

an image acquisition module, configured to acquire ground images by utilizing a UAV under a preset overlap degree to obtain a low-altitude UAV remote sensing image set under the preset overlap degree, where the low-altitude UAV remote sensing image set comprises a plurality of remote sensing images, and the remote sensing images are visible images or multispectral images;

a quality evaluation module, configured to perform a quality evaluation on each remote sensing image by utilizing an improved BRISQUE algorithm to obtain an image quality score;

a redundancy reduction module, configured to take a lower limit of the preset overlap degree as a fixed redundancy interval and perform a redundancy reduction on the low-altitude UAV remote sensing image set according to the fixed redundancy interval and the image quality score of each remote sensing image to obtain a redundancy-reduced image set;

a determination module, configured to determine whether the redundancy-reduced image set can be stitched or not;

a returning module, configured to, if yes, increase the fixed redundancy interval by 1 to obtain a new redundancy interval, take the new redundancy interval as a fixed redundancy interval of a next cycle, and return to the step of performing the redundancy reduction on the low-altitude UAV remote sensing image set according to the fixed redundancy interval and the image quality score of each remote sensing image; and a stitching module, configured to, if no, stitch the redundancy-reduced image set obtained in a previous cycle to obtain a stitched image.

The present disclosure provides a stitching quality evaluation method and system, and a redundancy reduction method and system for low-altitude UAV remote sensing images. The method comprises: firstly acquiring ground images by utilizing a UAV under a preset overlap degree to obtain a low-altitude UAV remote sensing image set under the preset overlap degree, then stitching the low-altitude UAV remote sensing image set to obtain a stitched image, and finally performing a quality evaluation on the stitched image by utilizing an improved BRISQUE algorithm to obtain an image quality score, which is applicable to quality evaluations of visible images and multispectral images at the same time through the improved BRISQUE algorithm. In addition, the present disclosure further provides an image redundancy reduction method based on the improved BRISQUE algorithm, so that the image stitching efficiency and stitching quality can be improved.

BRIEF DESCRIPTION OF THE DRAWINGS

To more clearly illustrate the embodiments of the present disclosure or the technical schemes in the prior art, the following briefly introduces the accompanying drawings to be used in the embodiments. Apparently, the accompanying drawings in the following description show merely some embodiments of the present disclosure, and those skilled in the art may still derive other drawings from these accompanying drawing without creative efforts.

DETAILED DESCRIPTION OF THE EMBODIMENTS

The following clearly and completely describes the technical schemes in the embodiments of the present disclosure with reference to the attached figures in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

The present disclosure provides a stitching quality evaluation method and system, and a redundancy reduction method and system for low-altitude UAV remote sensing images by using an improved BRISQUE algorithm to perform quality evaluation on the low-altitude UAV remote sensing images, which are applicable to both visible images and multispectral images. Meanwhile, an image redundancy reduction method is proposed based on the improved BRISQUE algorithm, which resolves a problem that image stitching to be performed after image acquisition is completed needs to spend a large amount of time, thereby improving the image stitching efficiency, as well as the image stitching quality.

To make the foregoing objective, features and advantages of the present disclosure clearer and more comprehensible, the present disclosure is further described in detail below with reference to the accompanying drawings and specific embodiments.

Embodiment I

Figure 1:
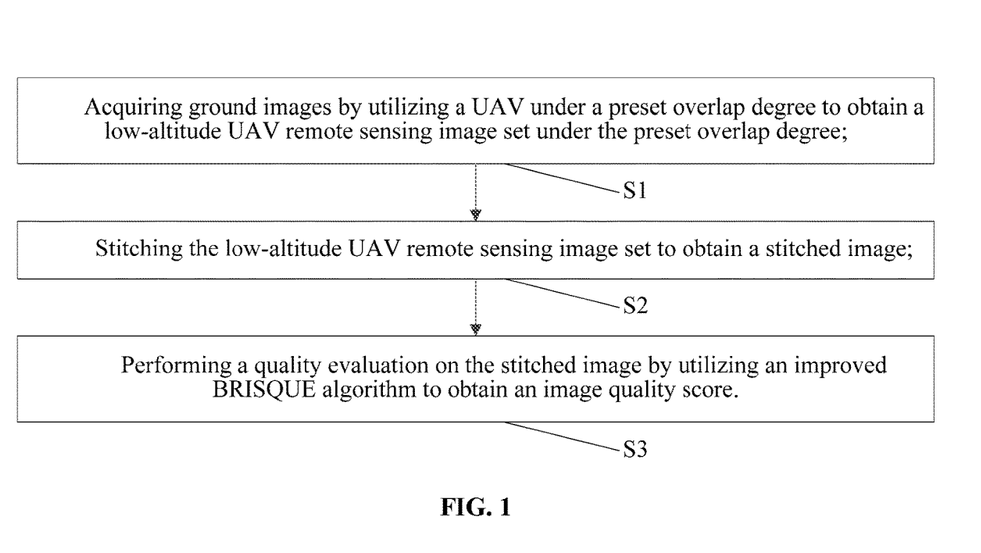
FIG. 1 is a method flow diagram of an evaluation method provided by the first embodiment of the present disclosure.

The embodiment provides a stitching quality evaluation method for low-altitude UAV remote sensing images. As shown in FIG. 1, the evaluation method comprises steps 1-3:

S1: ground images are acquired by utilizing a UAV under a preset overlap degree to obtain a low-altitude UAV remote sensing image set under the preset overlap degree; the low-altitude UAV remote sensing image set comprises a plurality of remote sensing images, and the remote sensing images are visible images or multispectral images.

According to the embodiment, an eight-rotor UAV flight platform can be used for carrying a multispectral camera and an RGB camera to acquire the ground images under the preset overlap degree. In the flight process, the remote sensing images acquired by the multispectral camera are multispectral images, and all the multispectral images form a multispectral low-altitude remote sensing image set. The remote sensing images acquired by the RGB camera are visible images, and all the visible images form a visible low-altitude remote sensing image set.

Figure 2A:
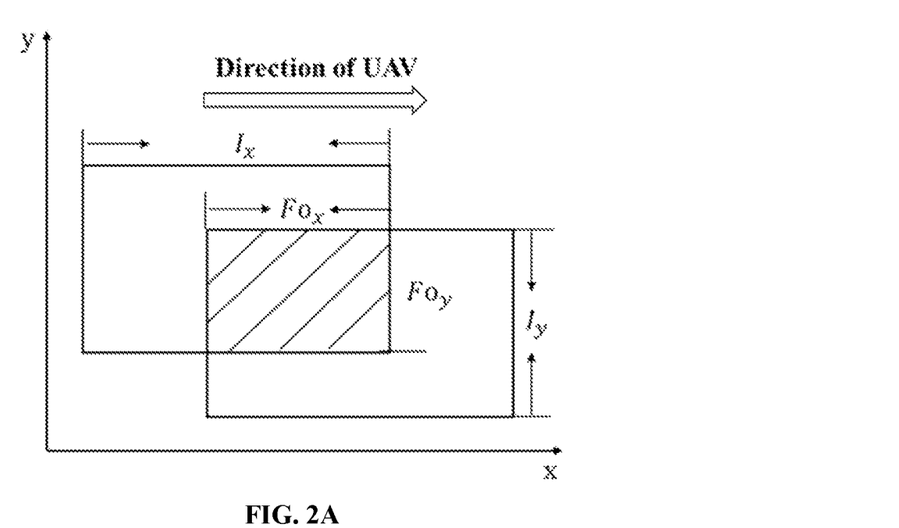
FIG. 2A and FIG. 2B are schematic calculation diagrams of the overlap degree provided by the first embodiment of the present disclosure.
Figure 2B:
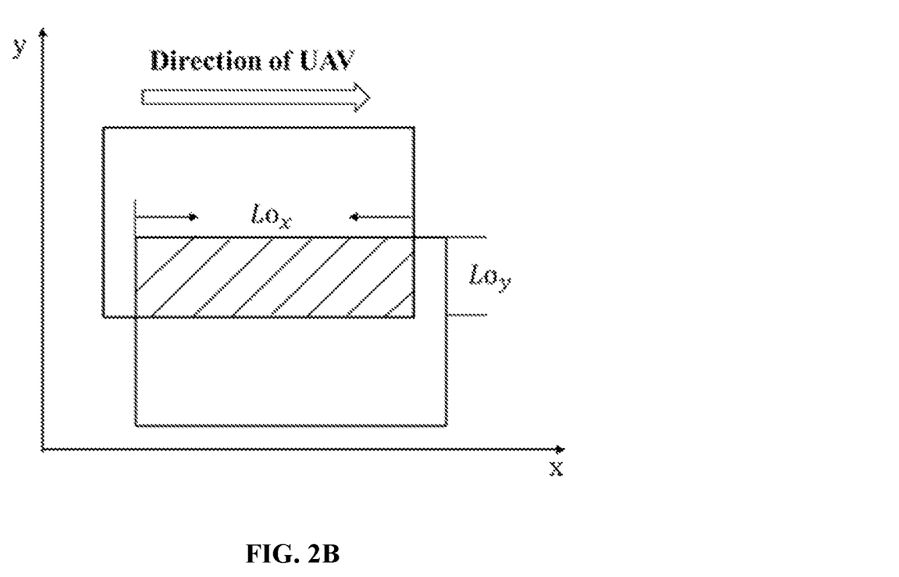

As shown in FIG. 2A and FIG. 2B, the remote sensing images in the later period need to be stitched to obtain a complete orthographic projection image. Therefore, certain requirements are set for the overlap degree when the remote sensing images are photographed. A selection principle of the preset overlap degree comprises determination of a lower limit of the preset overlap degree under the condition that the obtained low-altitude UAV remote sensing image set can complete stitching and determination of an upper limit of the preset overlap degree under the condition that the obtained low-altitude UAV remote sensing image set is not distorted (smeared) due to the fact that a setting of a exposure time of the camera has a certain influence on the upper limit of the overlap degree so that clear and effective images can be ensured to be obtained.

Specifically, the low-altitude UAV remote sensing image set is generally stitched using software, so that when the lower limit of the preset overlap degree is determined, a lowest overlap degree is set such that a single remote sensing image can be later stitched in a selected software. The selected software is Agisoft Photoscan software, and a lowest overlap degree is set such that the single remote sensing image can be later stitched in the Agisoft Photoscan software.

When the upper limit of the preset overlap degree is determined, the highest overlap degree is set such that the shot image is not smeared (distorted). The basic requirement that the image is not distorted in the moving process of the camera is that the exposure time of the camera is set to be smaller than or equal to one third of a length time of one pixel acquired for an actual image. If the basic requirement is met, distortion caused by image smearing in image quality evaluation can be ignored. Therefore, the upper limit value of the preset overlap degree is related to the exposure time (t(ms)), a camera sensor size (m(mm)*n(mm)), a pixel size (p(pixel)*q(pixel)), UAV flight speed (v(mm/s)). The specific calculation formula for setting the exposure time is as follows:

$$t \le \frac{m}{p \times v} \times \frac{1}{3}.$$

In the process, a camera aperture, ISO and other settings remain unchanged.

The determination of the upper limit of the preset overlap degree, under the condition that the obtained low-altitude UAV remote sensing image set is not distorted, may comprise determining the upper limit of the preset overlap degree according to the camera exposure time, the camera sensor size, the pixel size and the UAV flight speed.

It should be noted that the overlap degree in the embodiment may refer to both a longitudinal overlap degree and a lateral overlap degree. The longitudinal overlap degree refers to an image overlap degree maintaining between adjacent images when an aircraft photographs along an airline, and the lateral overlap degree refers to an image overlap degree maintaining between adjacent airlines when the aircraft photographs along the airline. When the remote sensing images are acquired, the overlap degree can be adjusted in the mode that a field angle of the camera is obtained in advance, an imaging range is fixed after a height is fixed, the overlap degree is determined by fixed-point emission of a camera trigger signal according to GPS positioning, where the camera shoots a picture every emission of the camera trigger signal.

S2: the low-altitude UAV remote sensing image set is stitched to obtain a stitched image.

Specifically, S2 may comprise the following sub-steps:

(1) Image preprocessing on the low-altitude UAV remote sensing image set is performed: damaged images caused by equipment problems in the low-altitude UAV remote sensing image set, are removed to obtain a preprocessed image set.

This step refers to a data preprocessing process, where image preprocessing is performed on all the obtained multi-band spectrum low-altitude remote sensing images (namely multispectral images) or visible low-altitude remote sensing images (namely visible images). That is, the damaged images caused by the equipment problems are removed, such that the multi-band spectrum low-altitude UAV remote sensing images or visible low-altitude remote sensing images with good quality form the preprocessed image set.

(2) The preprocessed image set is stitched to obtain a stitched image.

Image stitching is performed on the preprocessed image set by using the Agisoft Photoscan software, specifically including image alignment, grid establishment and image stitching, and finally a complete large stitched image is obtained.

S3: quality evaluation on the stitched image is performed by utilizing the improved BRISQUE algorithm to obtain an image quality score.

Figure 3:
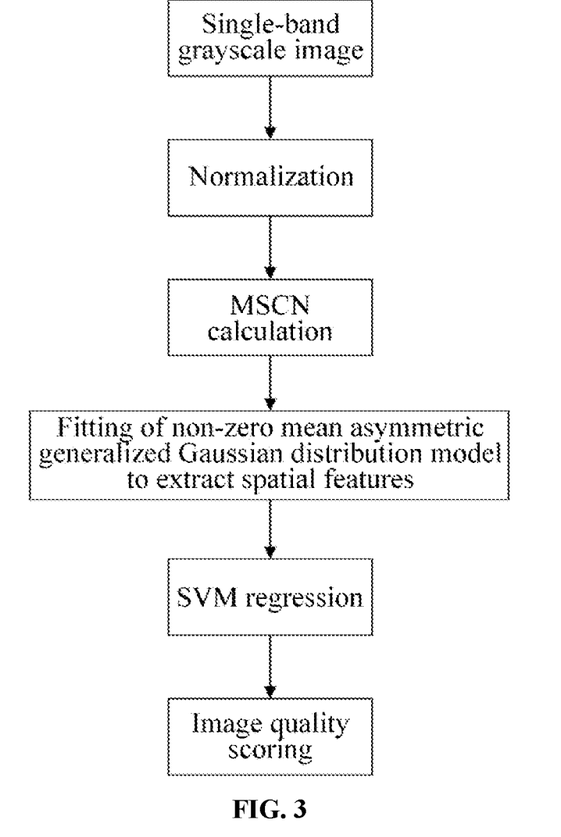
FIG. 3 is a flow diagram of an improved BRISQUE algorithm provided by the first embodiment of the present disclosure.

Specifically, the BRISQUE algorithm provides a quality evaluation method for spatial statistical image features according to changes of normalized features of distorted images. The method is applicable to natural scene images. The improved BRISQUE algorithm used in the embodiment can perform an image quality evaluation on the acquired visible images and multispectral images. As shown in FIG. 3, S3 may comprise:

(1) converting the stitched image into a single-band grayscale image, where the stitched image is converted into the single-band grayscale image through MATLAB specifically;

(2) performing a normalization on pixels of the single-band grayscale image to obtain a normalized image;

(3) calculating Pearson correlation coefficients (PCC) of MSCN adjacent coefficients of the normalized images in a horizontal direction, a vertical direction, a principle diagonal direction and a secondary diagonal direction;

(4) fitting the Pearson correlation coefficients into a non-zero mean asymmetric generalized Gaussian distribution model, and extracting features of the non-zero mean asymmetric generalized Gaussian distribution model to obtain spatial image features; and (5) inputting the spatial image features into a regression model of a support vector machine (SVM) for regression to obtain the image quality score, where the lower the image quality score is, the higher the quality of the stitched image is.

In the embodiment, the related parameters in the BRISQUE algorithm are modified by modifying a type of the input image, so that the method can be applicable to the quality evaluation of visible images and multispectral images at the same time.

The improved BRISQUE algorithm is used for evaluating the quality of the stitched image. The method can be applicable to the image quality evaluation of UAV remote sensing multispectral images and visible images at the same time. Compared with the traditional research that the method is only applicable to natural scene images, a new idea for the quality evaluation of the multispectral images is provided.

Certainly, the evaluation method used in the embodiment can also be used for discussing the influence of the overlap degree on the stitching quality. Specifically, the eight-rotor UAV flight platform is used for carrying a multispectral camera and an RGB camera to acquire crop images by adopting different overlap degree settings under the condition of the same flight speed (5 m/s), the same flight height (50 m) and the same flight path. Where the overlap degree is set between the lower limit and the upper limit of the preset overlap degree. In the S2 step, image stitching is performed by utilizing the Agisoft Photoscan software according to the flight number (namely, the overlap degree) to obtain the stitched image of a complete test area under each overlap degree. In the S3 step, the quality evaluation is performed on all the stitched images to determine the influence of the overlap degree on the stitching quality. At the moment, the method can be applicable to the quality evaluation of multispectral images and visible images at the same time.

Embodiment II

Figure 4:
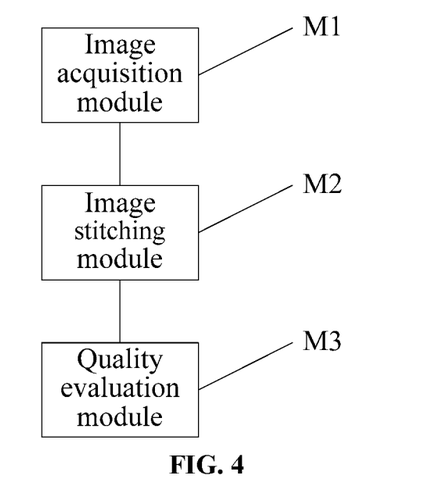
FIG. 4 is a system block diagram of an evaluation system provided by the second embodiment of the present disclosure.

The embodiment provides a stitching quality evaluation system for low-altitude UAV remote sensing images. As shown in FIG. 4, the evaluation system comprises:

an image acquisition module M1, configured to acquire ground images by utilizing a UAV under a preset overlap degree to obtain a low-altitude UAV remote sensing image set under the preset overlap degree, where the low-altitude UAV remote sensing image set comprises a plurality of remote sensing images, and the remote sensing images are visible images or multispectral images;

an image stitching module M2, configured to stitch the low-altitude UAV remote sensing image set to obtain a stitched image; and a quality evaluation module M3, configured to perform quality evaluation on the stitched image by utilizing an improved BRISQUE algorithm to obtain an image quality score.

Embodiment III

Figure 5:
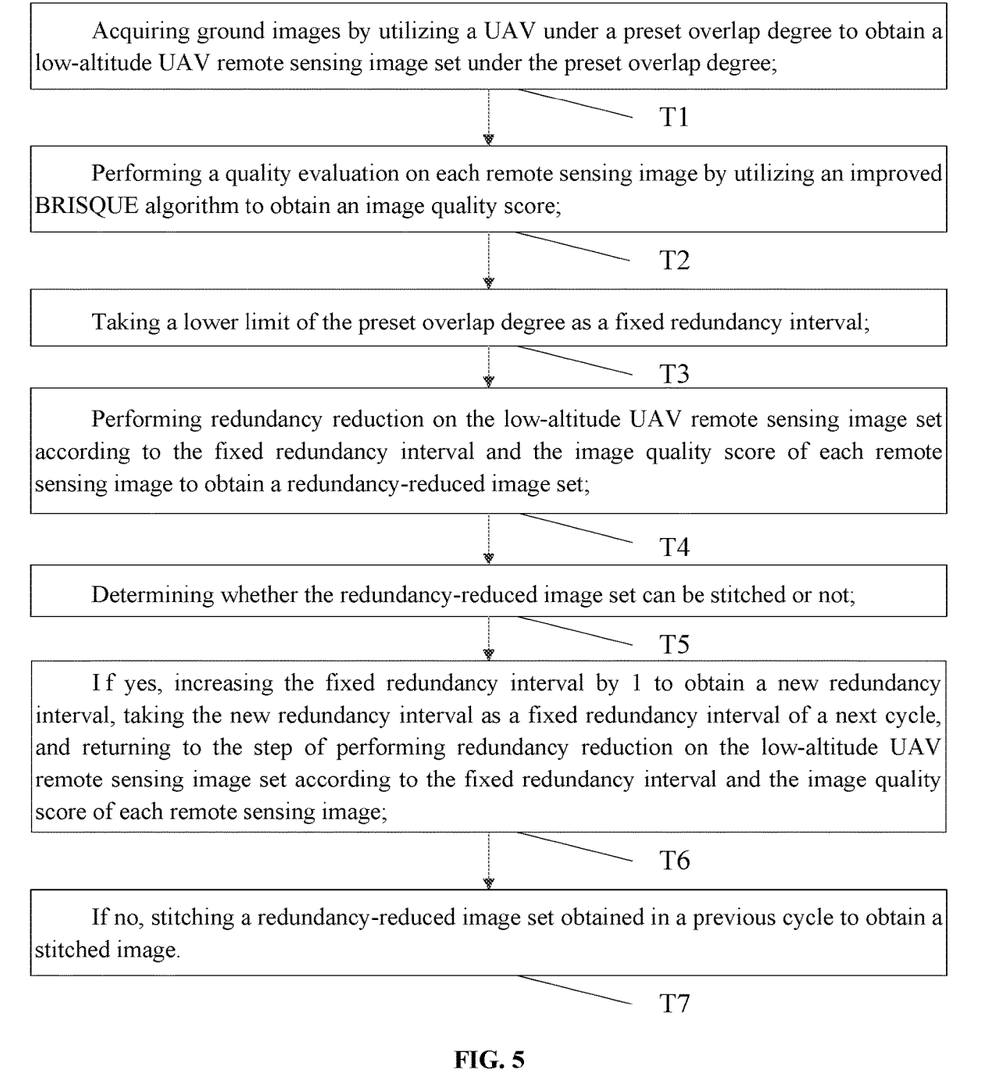
FIG. 5 is a method flow diagram of a redundancy reduction method provided by the third embodiment of the present disclosure.
Figure 6:
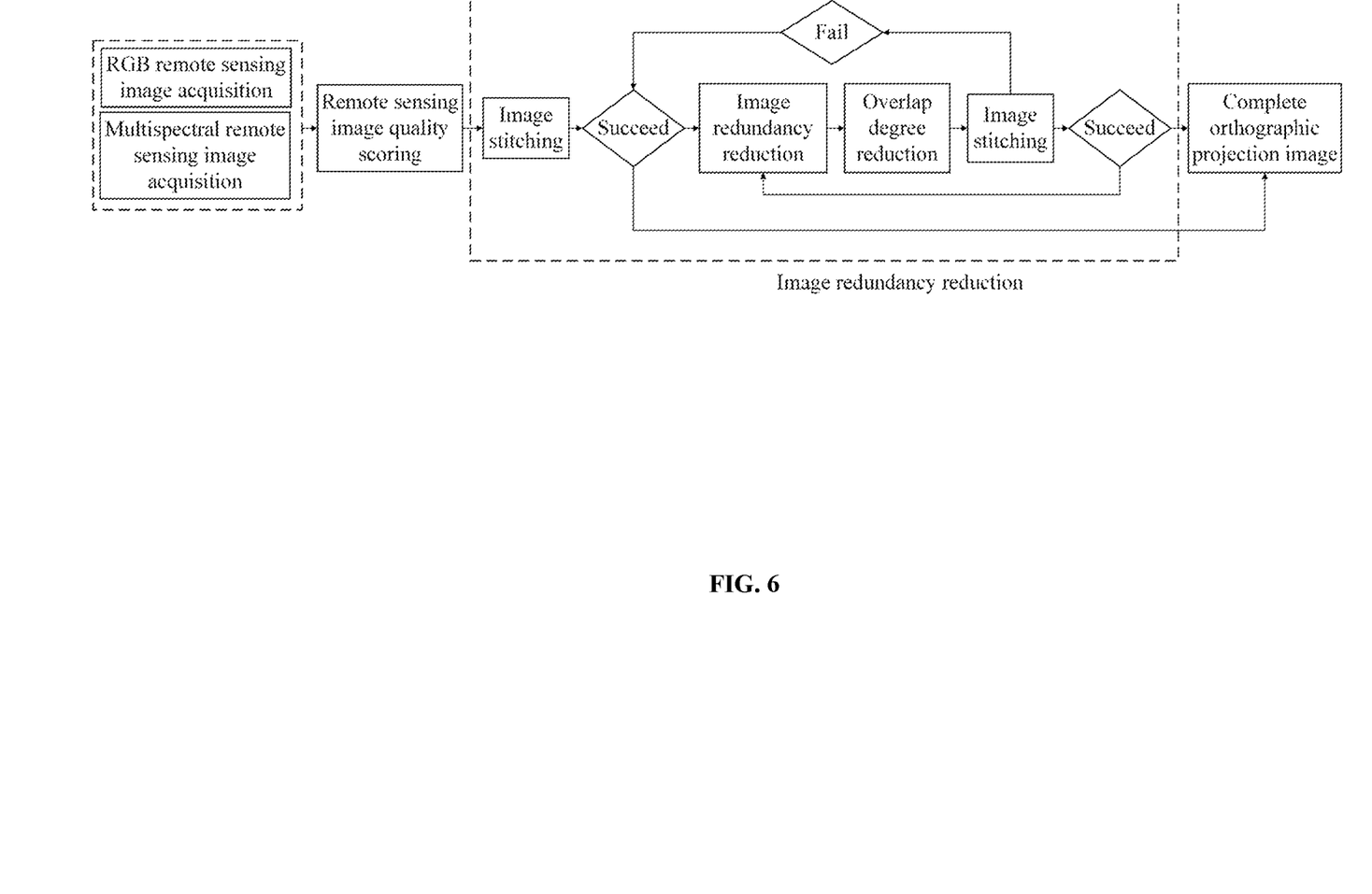
FIG. 6 is a flow diagram of an overall process of the redundancy reduction method provided by the third embodiment of the present disclosure.

The first embodiment discloses the method for evaluating the stitching quality of the low-altitude UAV remote sensing images based on the improved BRISQUE algorithm. The embodiment provides a redundancy reduction method for the images acquired in the flight of a UAV based on the method for evaluating the stitching quality of the low-altitude UAV remote sensing images so as to improve the image stitching efficiency and stitching quality. As shown in FIG. 5 and FIG. 6, the present disclosure provides a redundancy reduction method for the low-altitude UAV remote sensing images. The redundancy reduction method comprises steps T1-T7.

T1: ground images are acquired by utilizing a UAV under a preset overlap degree to obtain a low-altitude UAV remote sensing image set under the preset overlap degree, where the low-altitude UAV remote sensing image set comprises a plurality of remote sensing images, and the remote sensing images are visible images or multispectral images.

Step T1 is the same as step S1 in the first embodiment, and details thereof are not described herein again. The preset overlap degree also needs to satisfy the lower limit and the upper limit of the preset overlap degree proposed in the first embodiment.

T2: a quality evaluation is performed on each remote sensing image by utilizing the improved BRISQUE algorithm to obtain an image quality score.

The quality evaluation method for the remote sensing images is the same as the quality evaluation method for the stitched image in the first embodiment. T2 may comprise:

converting the remote sensing images into single-band grayscale images;

performing a normalization on pixels of the single-band grayscale images to obtain normalized images;

calculating Pearson correlation coefficients of MSCN adjacent coefficients of the normalized image in the horizontal direction, the vertical direction, the principal diagonal direction and the secondary diagonal direction;

fitting the Pearson correlation coefficients into a non-zero mean asymmetric generalized Gaussian distribution model, and extracting the features of the non-zero mean asymmetric generalized Gaussian distribution model to obtain spatial image features; and inputting the spatial image features into a regression model of a support vector machine (SVM) for regression to obtain an image quality score, where the lower the image quality score is, the higher the quality of the remote sensing image is.

T3, the lower limit of the preset overlap degree is taken as a fixed redundancy interval.

In the embodiment, the fixed redundancy interval is selected by taking the overlap degree as a standard and is not lower than a requirement of a minimum overlap degree, where the minimum overlap degree refers to the lower limit of the preset overlap degree.

T4: a redundancy reduction is performed on the low-altitude UAV remote sensing image set according to the fixed redundancy interval and the image quality score of each remote sensing image to obtain a redundancy-reduced image set.

In the embodiment, image quality scoring is performed on all the remote sensing images through the improved BRISQUE algorithm, and the images with the best quality are selected as images to be stitched in the fixed redundancy interval according to a scoring result, so that the redundancy-reduced image set is formed by the selected images. Specifically, T4 may comprise:

(1) sequentially arranging the remote sensing images in the low-altitude UAV remote sensing image set according to a sequence of shooting time;

(2) storing a first remote sensing image into the redundancy-reduced image set, and taking the first remote sensing image as an initial image;

(3) selecting a remote sensing image with the lowest image quality score in N continuous remote sensing images after the initial image as a selected image, and storing the selected image into the redundancy-reduced image set, where a value of N is determined according to the fixed redundancy interval; and (4) determining whether all the remote sensing images are screened or not:

if no, taking the selected image as an initial image in a next cycle, and returning to the step of selecting the remote sensing image with the lowest image quality score in N continuous remote sensing images after the initial image as the selected image; and if yes, obtaining the redundancy-reduced image set.

More specifically, by taking the fixed redundancy interval of 2 as an example, redundancy reduction steps are introduced: (1) selecting the first image of continuous aerial images; (2) screening out one image with the lower image score, namely the better quality, from two continuous images after the first image; (3) in two continuous images after the screened image, screening out one image with the lower image score, namely the better quality; (4) repeating step (3) until all images of an air strip are screened. The above steps are continuously applicable to screen a next air strip. A redundancy-reduced image set is formed by using all the screened images with the better quality. The images are stitched in the redundancy-reduced image set to obtain a high-quality orthographic projection image.

T5: whether the redundancy-reduced image set can be stitched is determined;

T6: If yes, the fixed redundancy interval is increased by 1 to obtain a new redundancy interval, the new redundancy interval is taken as a fixed redundancy interval of a next cycle, and returning to the step of performing the redundancy reduction on the low-altitude UAV remote sensing image set according to the fixed redundancy interval and the image quality score of each remote sensing image; and T7: if no, a redundancy-reduced image set obtained in a previous cycle is stitched to obtain a stitched image.

Under the same computer environment, high-resolution UAV remote sensing image stitching needs large workload. For example, when an experiment is performed, high-quality stitching of 400 RGB images with 40 million pixels takes 40 hours, while 200 RGB images only take more than ten hours.

The more the number of the images is, the more the working time during stitching is exponentially increased. After the redundancy reduction, the number of the images becomes smaller, and the stitching efficiency can be greatly improved by reducing the number of the images. In the embodiment, whether the remote sensing images obtained under the overlap degree can meet the redundancy reduction condition is firstly confirmed, so that image stitching is firstly performed. If image stitching can be performed, whether the remote sensing images under the overlap degree have image redundancy is checked, and image redundancy reduction is performed by taking a minimum value at the fixed redundancy interval. After redundancy reduction is completed, whether image stitching can be performed is checked again. If yes, image redundancy reduction is started by increasing the fixed redundancy interval by 1 until the whole stitching of the images cannot be completed, which indicates that the remote sensing images remaining in the previous cycle are the least images capable of obtaining the complete orthographic projection image. At the moment, the image stitching efficiency is the highest and the quality is the best. In the embodiment, the redundancy reduction can be performed to the maximum extent, thereby greatly reducing the number of images, improving the working efficiency. Further, in the redundancy reduction process, the images with the best quality are selected to form the redundancy-reduced image set based on the image quality evaluation method, so that the accuracy can be improved while the working efficiency is improved.

As another embodiment, the redundancy reduction method of the embodiment can further comprise the step that the improved BRISQUE algorithm is used for performing the quality evaluation on the stitched image, and the image quality score of the stitched image is obtained. According to the embodiment, the redundancy reduction is performed by performing quality evaluation on the remote sensing images. The quality evaluation of the stitched image aims to compare the influences on the image stitching quality before and after redundancy reduction, thereby effectively improving the image stitching quality.

The eight-rotor UAV flight platform is used for carrying a multispectral camera and an RGB camera to acquire crop images by adopting different overlap degree settings under the condition that the same flight speed (5 m/s), the same flight height (50 m) and the same flight path, where the overlap degree is set between the lower limit and the upper limit of the preset overlap degree. By utilizing the redundancy reduction method provided by the embodiment of the present disclosure, the remote sensing images under each overlap degree are screened and then stitched in sequence to obtain the screened orthographic projection image, the stitching time is recorded, and meanwhile, the quality of the stitched image is evaluated. Thus, according to the redundancy reduction method, the stitching efficiency can be greatly improved, and the stitching quality can be improved.

A higher overlap degree and shorter photographing interval in the general flight process causes the more obtained images of the target area and the more data volume, which needs the longer later image stitching time. The parameter setting is limited by the hardware parameters of the imaging equipment and the image stitching requirement, and has upper and lower threshold values. The quality of the stitched image obtained through the image stitching technology directly determines whether the information is obtained correctly or not. The image stitching efficiency can be improved while the stitched image with higher quality can be obtained through the step. Compared with a traditional UAV flight and data processing mode, the operation efficiency can be improved, the operation cost can be reduced, and agricultural practice can be better guided.

Embodiment IV

Figure 7:
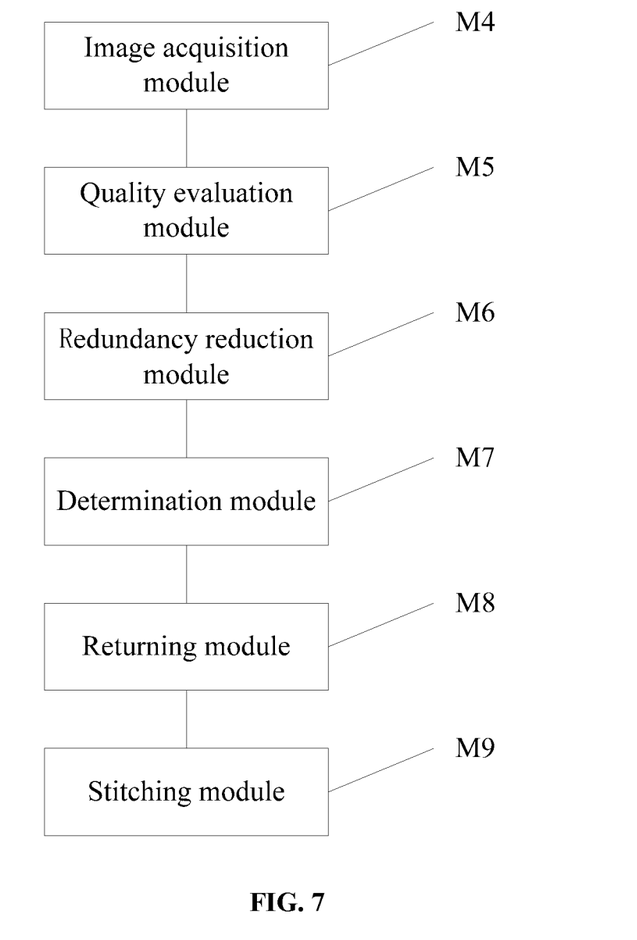
FIG. 7 is a system block diagram of a redundancy reduction system provided by the fourth embodiment of the present disclosure.

The present disclosure further provides a redundancy reduction system for low-altitude UAV remote sensing images. As shown in FIG. 7, the redundancy reduction system comprises:

an image acquisition module M4, configured to acquire ground images by utilizing a UAV under a preset overlap degree to obtain a low-altitude UAV remote sensing image set under the preset overlap degree, where the low-altitude UAV remote sensing image set comprises a plurality of remote sensing images, and the remote sensing images are visible images or multispectral images;

a quality evaluation module M5, configured to perform a quality evaluation on each remote sensing image by utilizing an improved BRISQUE algorithm to obtain an image quality score;

a redundancy reduction module M6, configured to take a lower limit of the preset overlap degree as a fixed redundancy interval and perform a redundancy reduction on the low-altitude UAV remote sensing image set according to the fixed redundancy interval and the image quality score of each remote sensing image to obtain a redundancy-reduced image set;

a determination module M7, configured to determine whether the redundancy-reduced image set can be stitched or not;

a returning module M8, configured to, if yes, increase the fixed redundancy interval by 1 to obtain a new redundancy interval, take the new redundancy interval as a fixed redundancy interval of a next cycle, and return to the step of performing the redundancy reduction on the low-altitude UAV remote sensing image set according to the fixed redundancy interval and the image quality score of each remote sensing image; and a stitching module M9, configured to, if no, stitch a redundancy-reduced image set obtained in a previous cycle to obtain a stitched image.

All embodiments in this specification are described in a progressive manner. Each embodiment focuses on differences from other embodiments. For the part that is the same or similar between different embodiments, reference may be made between the embodiments. The system disclosed in the embodiment corresponds to the method disclosed in the embodiment, and therefore the description is relatively brief. Related information refers to descriptions of the related parts in the method.

Several examples are used for illustration of the principles and implementation methods of the present disclosure. The description of the embodiments is used to help illustrate the method and the core principles of the present disclosure; and meanwhile, those skilled in the art can make various modifications in terms of specific embodiments and scope of application in accordance with the teachings of the present disclosure. In conclusion, the content of this specification shall not be construed as a limitation to the present disclosure.

What is claimed is:

1. A stitching quality evaluation method for low-altitude unmanned aerial vehicle (UAV) remote sensing images, comprising:

acquiring ground images by utilizing a UAV under a preset overlap degree to obtain a low-altitude UAV remote sensing image set under the preset overlap degree, wherein the low-altitude UAV remote sensing image set comprises a plurality of remote sensing images, and the remote sensing images are visible images or multispectral images, and a lower limit of the preset overlap degree is determined under a condition that the obtained low-altitude UAV remote sensing image set is able to be stitched and an upper limit of the preset overlap degree is determined according to a camera exposure time, a camera sensor size, a pixel size and a UAV flight speed under a condition that the obtained low-altitude UAV remote sensing image set is not distorted;

stitching the low-altitude UAV remote sensing image set to obtain a stitched image; and performing a quality evaluation on the stitched image by utilizing an improved BRISQUE algorithm to obtain an image quality score.

2. The evaluation method according to claim 1, wherein stitching the low-altitude UAV remote sensing image set to obtain the stitched image comprises:

performing image preprocessing on the low-altitude UAV remote sensing image set to remove damaged images in the low-altitude UAV remote sensing image set and obtain a preprocessed image set; and performing image stitching on the preprocessed image set to obtain a stitched image.

3. The evaluation method according to claim 1, wherein performing the quality evaluation on the stitched image by utilizing the improved BRISQUE algorithm to obtain the image quality score comprises:

converting the stitched image into a single-band grayscale image;

performing a normalization on pixels of the single-band grayscale image to obtain a normalized image;

calculating Pearson correlation coefficients of MSCN adjacent coefficients of the normalized image in a horizontal direction, a vertical direction, a principal diagonal direction and a secondary diagonal direction;

fitting the Pearson correlation coefficients into a non-zero mean asymmetric generalized Gaussian distribution model to obtain spatial image features; and inputting the spatial image features into a support vector machine to obtain an image quality score, wherein the lower the image quality score is, the higher quality of the stitched image is.

4. A stitching quality evaluation system for low-altitude unmanned aerial vehicle (UAV) remote sensing images, the system comprising a processor and a memory storing instructions that, when executed by the processor, cause the system:

to acquire ground images by utilizing a UAV under a preset overlap degree to obtain a low-altitude UAV remote sensing image set under the preset overlap degree, wherein the low-altitude UAV remote sensing image set comprises a plurality of remote sensing images, and the remote sensing images are visible images or multispectral images, and a lower limit of the preset overlap degree is determined under a condition that the obtained low-altitude UAV remote sensing image set is able to be stitched and an upper limit of the preset overlap degree is determined according to a camera exposure time, a camera sensor size, a pixel size and a UAV flight speed under a condition that the obtained low-altitude UAV remote sensing image set is not distorted;

to stitch the low-altitude UAV remote sensing image set to obtain a stitched image; and to perform a quality evaluation on the stitched image by utilizing an improved BRISQUE algorithm to obtain an image quality score.

5. A redundancy reduction method for low-altitude unmanned aerial vehicle (UAV) remote sensing images, comprising:

acquiring ground images by utilizing a UAV under a preset overlap degree to obtain a low-altitude UAV remote sensing image set under the preset overlap degree, wherein the low-altitude UAV remote sensing image set comprises a plurality of remote sensing images, and the remote sensing images are visible images or multispectral images;

performing a quality evaluation on each remote sensing image by utilizing an improved BRISQUE algorithm to obtain an image quality score;

taking a lower limit of the preset overlap degree as a fixed redundancy interval;

performing a redundancy reduction on the low-altitude UAV remote sensing image set according to the fixed redundancy interval and the image quality score of each remote sensing image to obtain a redundancy-reduced image set;

determining whether the redundancy-reduced image set is able to be stitched or not;

when the redundancy-reduced image set can be stitched, increasing the fixed redundancy interval by 1 to obtain a new redundancy interval, taking the new redundancy interval as a fixed redundancy interval of a next cycle, and returning to the step of performing the redundancy reduction on the low-altitude UAV remote sensing image set according to the fixed redundancy interval and the image quality score of each remote sensing image; and when the redundancy-reduced image set is unable to be stitched, stitching a redundancy-reduced image set obtained in a previous cycle to obtain a stitched image.

6. The redundancy reduction method according to claim 5, wherein performing the redundancy reduction on the low-altitude UAV remote sensing image set according to the fixed redundancy interval and the image quality score of each remote sensing image comprises:

sequentially arranging the remote sensing images in the low-altitude UAV remote sensing image set according to a sequence of shooting time;

storing a first remote sensing image into the redundancy-reduced image set, and taking the first remote sensing image as an initial image;

selecting a remote sensing image with a lowest image quality score from N continuous remote sensing images after the initial image as a selected image, and storing the selected image into the redundancy-reduced image set, wherein a value of N is determined according to the fixed redundancy interval;

determining whether all the remote sensing images are screened or not; wherein when all the remote sensing images are not screened, taking the selected image as an initial image in a next cycle, and returning to the step of selecting the remote sensing image with the lowest image quality score in N continuous remote sensing images after the initial image as the selected image.

7. The redundancy reduction method according to claim 5, wherein after the stitched image is obtained, the redundancy reduction method further comprises:

performing a quality evaluation on the stitched image by utilizing an improved BRISQUE algorithm to obtain an image quality score of the stitched image.

8. A redundancy reduction system for low-altitude unmanned aerial vehicle (UAV) remote sensing images, the system comprising a processor and a memory storing instructions that, when executed by the processor, cause the system:

to acquire ground images by utilizing a UAV under a preset overlap degree to obtain a low-altitude UAV remote sensing image set under the preset overlap degree, wherein the low-altitude UAV remote sensing image set comprises a plurality of remote sensing images, and the remote sensing images are visible images or multi spectral images;

to perform a quality evaluation on each remote sensing image by utilizing an improved BRISQUE algorithm to obtain an image quality score;

to take a lower limit of the preset overlap degree as a fixed redundancy interval and perform a redundancy reduction on the low-altitude UAV remote sensing image set according to the fixed redundancy interval and the image quality score of each remote sensing image to obtain a redundancy-reduced image set;

to determine whether the redundancy-reduced image set can be stitched or not;

when the redundancy-reduced image set can be stitched, increase the fixed redundancy interval by 1 to obtain a new redundancy interval, take the new redundancy interval as a fixed redundancy interval of a next cycle, and return to the step of performing the redundancy reduction on the low-altitude UAV remote sensing image set according to the fixed redundancy interval and the image quality score of each remote sensing image; and when the redundancy-reduced image set is unable to be stitched, stitch a redundancy-reduced image set obtained in a previous cycle to obtain a stitched image.

* * * * *